Dec. 15, 1942.   J. DICKSON   2,304,892
ENGINE BALANCING
Original Filed June 5, 1939   3 Sheets-Sheet 1
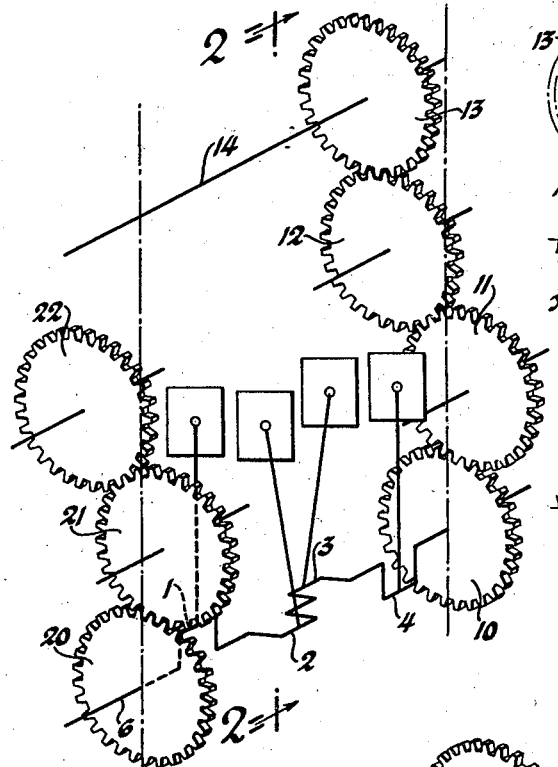
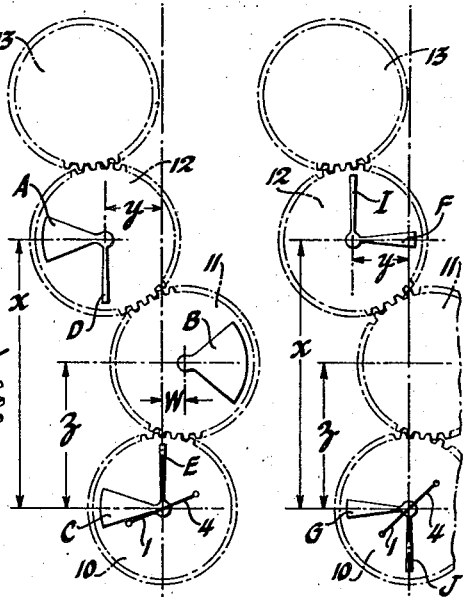
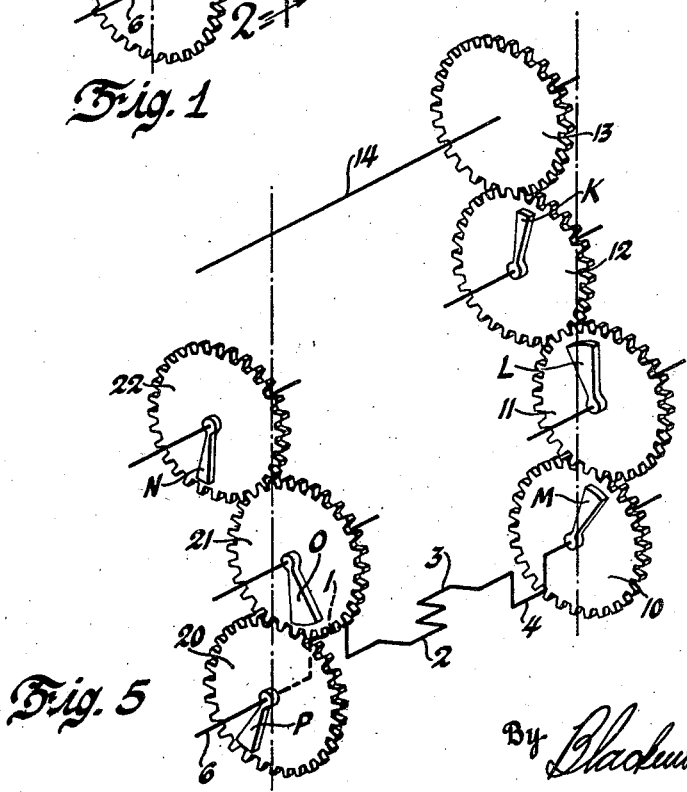
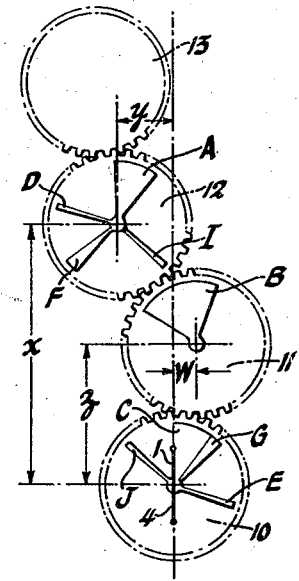
Inventor
John Dickson
By Blackmore, Spencer & Flint
Attorneys Dec. 15, 1942.  J. DICKSON  2,304,892
ENGINE BALANCING
Original Filed June 5, 1939  3 Sheets-Sheet 2

Inventor
John Dickson
By Blackmore, Spencer & Hurt
Attorneys

Dec. 15, 1942.  J. DICKSON  2,304,892
ENGINE BALANCING
Original Filed June 5, 1939   3 Sheets-Sheet 3

Inventor
John Dickson
By Blackmore, Spencer & Flint
Attorneys

Patented Dec. 15, 1942

2,304,892

UNITED STATES PATENT OFFICE 2,304,892

ENGINE BALANCING

John Dickson, Ferndale, Mich., assignor to General Motors Corporation, Detroit, Mich., a corporation of Delaware Original application June 5, 1939, Serial No. 277,423. Divided and this application January 23, 1942, Serial No. 427,901

2 Claims. (Cl. 74—604)

This invention is a division of copending application Serial No. 277,423, filed June 5, 1939, now Patent No. 2,280,384 and relates to means for eliminating or reducing the vibration of machines with reciprocating parts, and especially to the balancing of disturbing force couples in multi-cylinder internal combustion engines, particularly inertia force couples and couples due to piston side thrust forces, which tend to rock the engine in planes at right angles to each other. These couples are reversing couples and vary from zero to a maximum in one direction and then in an opposite direction at the frequency of the speed of the crankshaft, or at higher harmonics of that speed.

It is well known that in a single cylinder engine, any harmonic of the inertia forces of the reciprocating masses may be balanced, by a pair of eccentric masses revolving in opposite directions with the same frequency as the inertia force to be balanced, together balancing the inertia forces, and counter-balancing each other in a direction at right angles to the direction of the inertia forces; and that in a multi-cylinder engine, a harmonic couple due to the inertia forces of the reciprocating masses and tending to rock the engine in the plane of the cylinder center lines may be balanced by a pair of eccentric masses at each side of the neutral axis, revolving at the frequency of the particular harmonic to be balanced, and oppositely phased from each other to give the required balancing couple. In cases where the number of cylinders is such that there is more than one rocking couple of the same harmonic, the balancing masses for the pistons on each side of the neutral axis have been aggregated in a single pair of eccentric masses producing the required balancing couple for each of the inherent rocking couples at the required time.

It is also known that in a single cylinder engine, a harmonic couple due to the piston side thrust forces and their corresponding reactions at the crankshaft, and tending to rock the engine in a plane normal to the crankshaft axis, may be balanced by an oppositely alternating couple produced by a pair of eccentric masses revolving at the frequency of the particular harmonic to be balanced, and so phased and spaced from each other to produce the required counteracting couple in said plane. Since it is not usually possible or convenient to arrange the required masses actually in the plane of the connecting rod they are divided on either side thereof.

In a multi-cylinder engine, while any harmonic couple of the side thrust forces of each of the pistons and their reactions at the crankshaft in planes normal to the crankshaft axis may be independently balanced in the same way, such a construction would be expensive if it is not otherwise impracticable. It has heretofore been proposed to aggregate the requisite balancing masses for the couples of a certain harmonic at each crank, in a single pair of masses in the plane of symmetry of the engine, or divided between pairs of eccentric masses at each end of the engine, and to combine with such masses the requisite masses for balancing the inertia forces of the same harmonic, but in all instances only the couples and forces of those harmonics of a frequency equal to the speed of the engine multiplied by the number of differently phased cranks have been balanced, and then only in those cases where the crank arrangement has been such that the aggregative side thrust forces of all the pistons produce no aggregative couples of the same harmonic tending to twist the frame of the engine in a plane or planes parallel to the crankshaft axis and normal to the plane of the cylinder center lines, and the inertia forces produce no couple tending to rock the engine in the plane of the cylinder center lines. This is probably so, for the reason that the couples at each crank in planes normal to the crankshaft axis are differently phased even though identical, and it has been believed that since a single pair of masses can only produce two opposite forces and one reversing couple per revolution, they must run at the engine speed multiplied by the number of differently phased cranks, or some whole multiple thereof, to balance the piston side thrust couples and inertia forces at all the cranks, and then are only suitable for balancing the couples of a harmonic frequency equal to that speed; and cannot, while producing equal counteracting couples for the couples at all the cranks, at the same time produce different balancing couples for the different side thrust force couples of pistons spaced different distances from a neutral axis, in a plane or planes parallel to the crankshaft axis and normal to the plane of the cylinder center lines, or for the different inertia force couples in the plane of the cylinder center lines.

In other words, while in engines in which there are no couples in planes longitudinally of the engine, the method of combining at each end of the engine, eccentric masses revolving in opposite directions to produce forces and couples in planes normal to the crankshaft axis to balance both the inertia forces in the plane of the cylinder center lines and the piston side thrust couples in planes normal to the crankshaft axis of that harmonic of engine speed equal to the number of differently phased cranks is known, the method according to the present invention, of balancing the same forces and couples in engines having at the same time disturbing couples in planes longitudinally of the engine has not heretofore been known.

Now if the piston side thrust forces of a multi-cylinder engine are considered as a whole in a plane or planes parallel to the crankshaft axis and normal to the plane of the cylinder center lines, and independently of their reactions at the crankshaft, they may produce an aggregative couple or couples in such planes parallel to the crankshaft axis, varying periodically in value at some multiple of engine speed, and tending to bend the engine frame. If the piston side thrust forces do as a whole produce an aggregative couple in a plane or planes parallel to the crankshaft axis and normal to the plane of the cylinder center lines, their reactions at the crankshaft will produce a similar but opposite aggregative couple in that plane of the crankshaft axis normal to the plane of the cylinder center lines, thus tending to bend the engine frame in an opposite direction.

The couples due to the piston side thrust forces acting in one direction and those due to their reactions at the crankshaft acting in an opposite direction, in parallel planes spaced from each other, are frame twisting couples and hereafter will be so designated.

All two cycle multi-cylinder in line or V type engines with cranks arranged for firing at equal intervals once per revolution in each cylinder have rocking couples of one harmonic or more in planes longitudinally of the engine, and this invention is concerned with the balancing of any such harmonic frame twisting couple or couples (in a plane normal to the plane of the cylinder center lines) in such engines or any other engines in which frame twisting couples exist, in a simple and practical way, by masses aggregated at the ends of the engine.

One object of the invention is a method and means of balancing frame twisting couples of any harmonic, resulting from the piston side thrust forces in a multi-cylinder engine.

Another object of the invention is to combine the balancing means for the frame twisting couples (in planes parallel to the crankshaft axis and normal to the plane of the cylinder center lines) with that for the inertia couples (in the plane of the cylinder center lines).

The above and other objects of the invention will be apparent as the description proceeds.

According to the invention, it is first necessary to determine, for all crankshaft positions, the sum of the frame twisting couples of all harmonics of the piston side thrust forces at maximum engine speed and load, as resolved in a plane parallel to the crankshaft axis and normal to the plane of the cylinder center lines at a mean distance from the crankshaft axis.

The mass of the reciprocating parts being known, and an indicator card being available, the piston side thrust forces in one cylinder, due to gas pressure and inertia force, at equal crank angle intervals throughout one cycle are determined and tabulated together with their respective moments about the crankshaft axis; the sum of the moments is divided by the sum of the forces, to obtain the mean distance from the crankshaft axis at which the piston side thrust may be considered to occur; then by dividing the moments at the various crank angles by the mean distance, the equivalent side thrust force at this distance from the crankshaft axis, at the various crank angles during one revolution is determined; (when this piston side thrust force is plotted against crank angle the resulting curve may be used to determine the equations for each harmonic of the piston side thrust in one cylinder in terms of the crank angle); assuming the same equivalent piston side thrust force at the same crank angle in each cylinder, these forces are multiplied by their respective distances from a neutral axis at the center of the engine, to obtain their moments in a plane parallel to the crankshaft axis and normal to the plane of the cylinder center lines, at the aforesaid mean distance from the crankshaft axis; the moments of the piston side thrust forces in each cylinder in this plane are then tabulated in their proper phase relationship relative to the various crank angles for one of the cylinders, and summed to give for all the various crankshaft positions, the total or resultant maximum moment in a plane parallel to the crankshaft axis and normal to the plane of the cylinder center lines, at the aforesaid mean distance from the crankshaft axis.

In order to find the sum, or the resultant of the moments of a particular harmonic of the piston side thrust forces of all the cylinders in the same mean plane, in terms of that harmonic of the piston side thrust force in one cylinder, the force vectors of the particular harmonic in all the cylinders are multiplied by their respective distance from the neutral axis at the middle of the engine (assuming the distance between adjacent cylinders to be unity), to obtain their relative moments; these moment vectors are then summed vectorially in order to determine the resultant moment vector, its relative size and its phase angle for all the cylinders combined; the actual resultant moment is of course the product of the resultant moment vector, the cylinder spacing in inches, and the expression for the same harmonic of the piston side thrust force in one cylinder, with the necessary change in the term which is a function of the crank angle, because of a change in the phase angle for all the cylinders combined. The resulting equation gives for all the various crankshaft positions, the total or resultant moment of the particular harmonic of the piston side thrust forces of all the cylinders in a plane parallel to the crankshaft axis and normal to the cylinder center lines at the aforesaid mean distance from the crankshaft axis.

According to the invention, the resultant maximum rocking couple of any harmonic of the piston side thrust forces of all the cylinders, in a plane parallel to the crankshaft axis and normal to the cylinder center lines and the opposite reaction couple in that plane of the crankshaft axis normal to the plane of the cylinder center lines are resolved into alternating oppositely phased couples in planes at opopsite ends of the engine normal to the crankshaft axis, which are balanced by alternating couples in said planes produced by at least one pair of eccentric masses constituting weights geared to the engine crankshaft and revolved thereby in each of said planes at the speed of the harmonic to be balanced, about axes spaced from each other on the engine frame. In order to produce the required balancing couples in planes normal to the crankshaft axis, the eccentric masses at each end of the engine may revolve in like or unlike directions, but must be oppositely phased when in positions of revolution in which their directions of eccentricity are normal to the plane of the cylinder center lines. If, however, they revolve in unlike or opposite directions their axes must lie in spaced planes normal to the plane of the cylinder center lines for the reason that if they were to revolve in opposite directions about axes in a common plane normal to the plane of the cylinder center lines they could only produce an alternating force and no alternating couple in the plane normal to the crankshaft axis in which they revolve. When they revolve in opposite directions about axes in spaced planes normal to the plane of the cylinder center lines they produce both an alternating couple and an alternating force in the plane normal to the crankshaft axis in which they revolve. If, in these circumstances, the mass and moment of the weights is such that the oppositely alternating forces at each end of the engine will balance an inertia force couple in a well known way, the distance apart of said planes of their axes may be made such that the alternating couples they produce will balance the couples to be balanced in the planes normal to the crankshaft axis in which they revolve. A train of gears at each end of the engine in which there are gears running in the same direction and in opposite directions, i. e., at least three gears, is, however, desirable, particularly where both inertia force couples and frame twisting couples are to be balanced if only for the reason that the individual gears may then be located in any position best suiting the design requirements of the engine, (i. e., the gears necessary to drive an overhead camshaft may be positioned without regard to their use for balancing the engine). Should the disposition of the balancing masses on such gears give rise to an unwanted couple about an axis displaced from the plane of the cylinder center lines, it may be balanced by the addition of small auxiliary balance masses in two of the gears such that they will create an opposing couple at the required instant.

Because the piston side thrust couples change almost directly as the cylinder mean effective pressure changes, and the effectiveness of the rotating eccentric masses changes as the square of the speed at which they are rotating, complete balance will only be achieved at the speed and mean effective pressure for which the balance weights were designed; for all other speeds and mean effective pressures the summation of the piston side thrust couples will be somewhat over or under balanced.

The primary and secondary frame twisting couples are generally large in magnitude compared with the summation of all the harmonics, and the frame deflecting effect of the various harmonics diminishes as the square of the harmonic producing it, so that by counteracting the first and perhaps the second harmonic, the total frame twisting couple is reduced to a negligible fraction of its original value. Accordingly, it will seldom be necessary in practice to balance more than the primary and secondary harmonic couples, although any higher harmonics can be balanced in a similar way, provided the gear train includes gears running at the frequency of the particular harmonic.

The force required of the eccentric balance weights in planes normal to the crankshaft axis at each end of the engine, to balance the frame twisting couple of a particular harmonic of the piston side thrust forces of all the cylinders, is obtained by dividing the couple, by the distance between the weights at opposite ends of the engine; the mass radius or moment of an eccentric weight which will produce an equivalent centrifugal force when running at the speed of the particular harmonic is then determined; eccentric weights of a similar mass radius, but oppositely phased, are also required at each end of the engine, to balance the reaction of the frame twisting couple in the plane of the crankshaft.

Since the two alternating frame twisting couples in planes parallel to the crankshaft axis are oppositely phased, their eccentric balancing masses at each end of the engine will each create second moment couples in their planes normal to the crankshaft axis. It will be apparent therefore that the axes of the eccentric balancing masses at each end of the engine need not be both in the plane of the cylinder center lines and in the planes of their respective frame twisting couples, but that provided their couples in planes normal to the crankshaft axis remain unchanged, and equal to the couples to be balanced, the masses may be disposed about axes parallel to the crankshaft axis, in any position in such planes on opposite sides of the neutral axis and normal to the crankshaft axis.

The drawings show, somewhat diagrammatically, some possible applications of the invention to two-cycle multi-cylinder engines.

In the drawings

Figure 1 is a diagrammatic perspective view of the crankshaft of a vertical four-cylinder in-line, two-cycle engine, with gears running at engine speed in gear trains at each end of the crankshaft.

Figure 2 is a diagrammatic view of the rear gear train as viewed from the front on line 2—2 of Figure 1, with the addition to the gear wheels of the requisite eccentric masses for balancing the rocking couples due to the primary inertia forces.

Figure 3 is a diagrammatic view of the rear gear train as viewed from the front on line 2—2 of Figure 1 with the addition to the gear wheels of the requisite eccentric masses for balancing the first harmonics of the primary frame twisting couples.

Figure 4 is similar to Figures 2 and 3, but shows the required balancing masses of Figures 2 and 3 superimposed upon one another in their proper phase relationship to produce the several required moments occurring at various angles of some of the gears.

Figure 5 shows the balancing masses of Figure 4 resolved into single masses in their respective gears, as applied to each end of the engine of Figure 1, with the required moments in particular angular relationships to each other and the crankshaft, to completely balance the first harmonic of the frame twisting couple and the primary inertia rocking couple, at full load.

Figure 6:
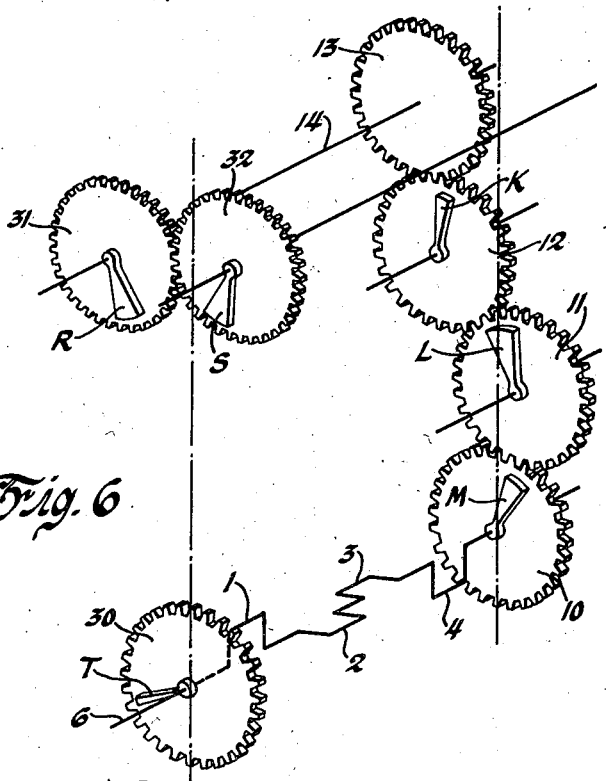
Figure 6 shows an alternative disposition of balancing masses in a modified gear train at the front end of an engine similar to that shown in Figure 1, cooperative with the balancing masses in the gear train at the rear end of the engine, to completely balance the same couples as those dealt with in the arrangement of Figure 5.

The vertical four-cylinder in-line two-cycle engine of Figures 1, 5 and 6 has four cranks 1, 2, 3 and 4, on a crankshaft 6. Cranks 1 and 4 are at 180° to each other and cranks 2 and 3 are at 180° to each other in a plane at right angles to the plane of cranks 1 and 4 for power impulses to the cranks in the sequence 1, 3, 4, 2 every 90° of crankshaft rotation. The crank arrangement is such that there is a rocking couple due to the primary inertia forces and a primary frame twisting couple due to the piston side thrust forces.

In Figures 1, 5, and 6 there is at the rear end of the engine, a train of gears all of which run at engine speed, consisting of a gear wheel 10 on the crankshaft, a crankshaft idler gear 11, a camshaft idler gear 12, and a camshaft gear 13 transmitting the drive from the crankshaft 6 to a camshaft 14; coaxial with the gears 10, 11, and 12 of Figures 1 and 5, are gears 20, 21, and 22 respectively at the opposite end of the engine.

In Figure 2, which shows eccentric balancing weights A, B, and C, having the requisite moments for balancing the primary inertia rocking couple, the eccentric weights A and C are similarly phased on the gears 12 and 10 which run in the same direction, while the weight B is oppositely phased on the gear 11 running in an opposite direction. The moment of the weights A, B and C, as represented by their reference characters, is such that $A+B+C$ is equal to the moment of a revolving weight whose centrifugal force is sufficient to balance the force of the primary inertia rocking couple; and $A-B+C=0$. The weights D and E are equal and oppositely phased on the gears 12 and 10, to balance the unwanted couple arising about the line of the plane of the cylinder center lines, due to the fact that the axes of the weights A and B are displaced from the plane of the cylinder center lines. Their moments as represented by their reference characters are such that $$(A \times x) + (D \times y) = (B \times z)$$

and $$(A \times y) - (D \times x) = (B \times w)$$

It will be seen that the weights A, B and C are so phased that they will create an alternating upward and downward force which will at all times balance the force of the couple due to the primary inertia forces in the plane of the cylinder center lines.

In Figure 3, which shows eccentric balancing weights having the requisite moments for balancing the primary frame twisting couples due to the piston side thrust forces, the eccentric weights F and G are equal but oppositely phased on the gears 12 and 10 respectively, which run in the same direction. The weights I and J are similarly equal and oppositely phased on the gears 12 and 10, and are required in order to provide a couple which will balance the unwanted couple arising about the line of the plane of the cylinder center lines (due to the fact that the axis of the weight F is displaced from the plane of the cylinder center lines), and which is a maximum when the weights F and G are in a vertical position. The mass radius or moment of the weights being represented by their reference characters, their moments are such that $(F \times x) + (I \times y)$ is equal to the product of the moment of a revolving weight whose centrifugal force is sufficient to balance the force of the frame twisting couples, and the distance between the planes of the frame twisting couples; or expressed otherwise, to the equivalent couple required at each end of the engine in a plane normal to the crankshaft axis; and $J \times x$ and $F \times y$ are equal but opposite. It will be seen that the weights F and G are so phased that they will create an alternating couple in a plane normal to the crankshaft axis, which will have its maximum value when the resultant moment of the primary harmonic of the piston side thrust forces is a maximum.

In Figure 4, the weights A, B, C, D, and E of Figure 2, and F, G, I, and J of Figure 3, have been superimposed upon one another in their proper phase relationship. The resultant moment of all the masses in each of the gears is then determined, and Figure 5 shows the resultants K, L, M in their proper phase relationship, with similar weights N, O, P in the gears 22, 21 and 20, but oppositely phased from those in the gears 12, 11 and 10.

Figure 6 shows an alternative disposition of the balance weights for the primary inertia couples and the primary frame twisting couples in three gears 30, 31 and 32 at the front end of the engine, of which the gears 31 and 32 have their axes in a plane normal to the plane of the cylinder center lines and are spaced from a third gear 30 on the crankshaft axis. The gear 31 is on the camshaft 14, and runs in an opposite direction from the crankshaft gear 30, while the gears 30 and 32 run in the same direction. The balancing masses for the primary frame twisting couples are divided between the gears 30 and 32, with auxiliary masses in the same gears, because gear 32 is not on the engine center line like gear 30. The balancing masses for the primary inertia rocking couple are divided between the gears 31 and 32, with auxiliary masses in the gears 30 and 31, because gears 31 and 32 are at unequal distances from the plane of the cylinder center lines. The resultants R, S, T of the masses in each of the gears are disposed as shown.

Figure 7:
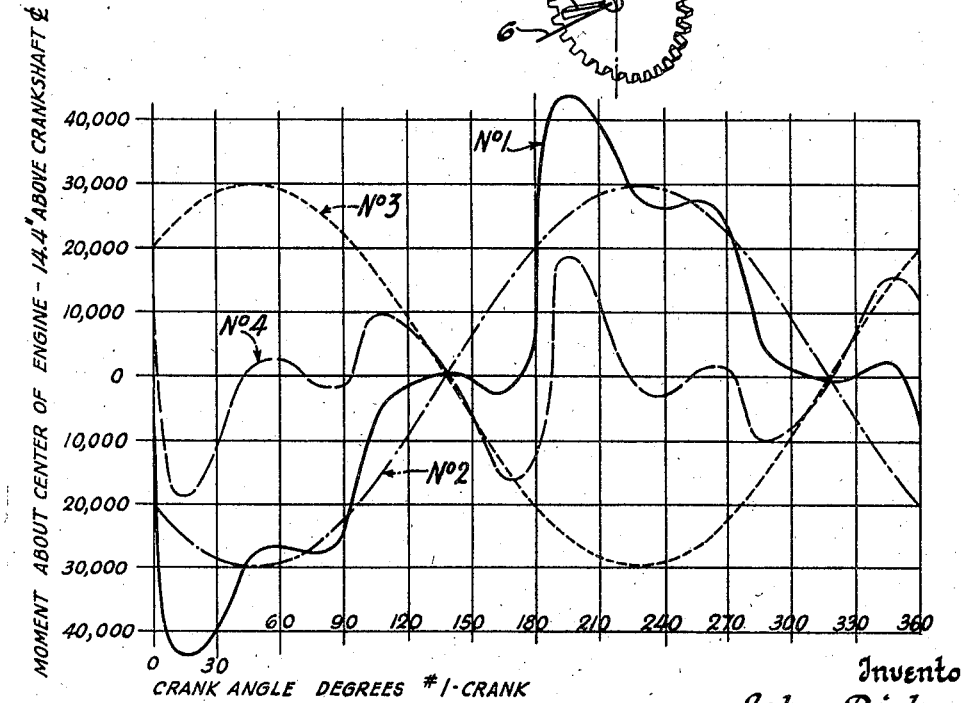
Figure 7 shows various moments, at a mean distance away from the crankshaft axis in a plane parallel to the crankshaft axis, and normal to the plane of the cylinder center lines, of an actual two cycle engine having a cylinder and crank arrangement as shown in Figures 1, 5, and 6.

In Figure 7, in which the moments about the center of an actual engine such as that shown in Figures 1, 5, and 6, in the mean plane of the piston side thrust forces 14.4″ above the crankshaft center line, are plotted against different positions of the crankshaft with reference to the crank angle of crank 1; the curve #1 shows the sum or the resultant maximum moment of the frame twisting couples of all harmonics of the piston side thrust forces at maximum engine speed; the curve #2 shows the first harmonic of curve #1; the curve #3 shows the moment produced by the balance gears which is equal but opposite to that produced by the piston side thrust forces shown in curve #2; the curve #4 shows the unbalanced moment left in the engine, after the first harmonic of the piston side thrust force couples has been balanced.

Figure 8:
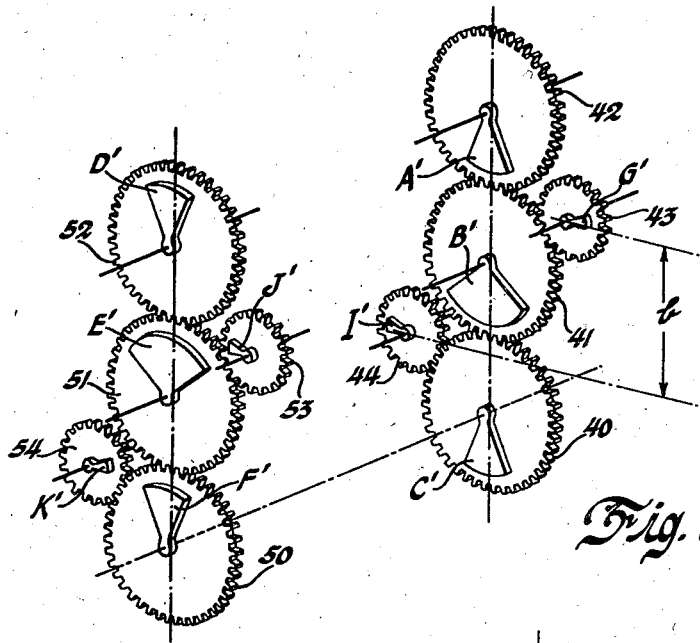
Figure 8 shows a possible gear train for balancing a vertical two-cycle engine having primary inertia couples, secondary inertia couples, and secondary frame twisting couples.

The engine of the arrangement shown in Figure 8, is assumed to be one in which the primary frame twisting couple is so small as to require no balancing, but in which there is a primary inertia rocking couple, a secondary inertia rocking couple, and a secondary frame twisting couple to be balanced. The balancing masses for the primary inertia couple are divided between three gears 40, 41 and 42 at one end of the engine, and 50, 51 and 52 at the opposite end of the engine, and running at engine speed. The gears 41 and 51 run in an opposite direction to the gears 40, 42 and 50, 52. The axes of these gears in each train are in the plane of the cylinder center lines, so that when the weights A', B' and C' and the corresponding but oppositely phased weights D', E', F' at the opposite end of the engine, which have a moment distribution in the ratio one, two, one, are in a horizontal position, there will be no unbalanced moments in either of the gear trains. In their vertical position the weights are phased alike, and their moments at each end of the engine are additive to create the requisite forces to balance the primary inertia rocking couples. The small gears 43, 44 run in opposite directions at twice engine speed along with their corresponding gears 53 and 54 at the opposite end of the engine. The balance weights G' and I' in their horizontal position are oppositely phased in the gears 43 and 44, and the balance weights J' and K' in the gears 53 and 54 are similarly phased opposite to each other and to the weights G' and I'. It will be seen that in their vertical position because of their rotation in contrary directions, the weights G' and I' are phased alike, and that the weights J' and K' in their vertical position are phased alike but in an opposite direction to the weights G' and I'. The weights G', I' and J', K', are therefore additive to balance the secondary inertia rocking couple. So that they may at the same time balance the secondary frame twisting couple, their distance apart $b$, can be made such that the moments required of the weights G', I', and J', K', to balance the secondary inertia rocking couple will produce a twisting couple of a magnitude which will balance the secondary frame twisting couple.

Figure 9:
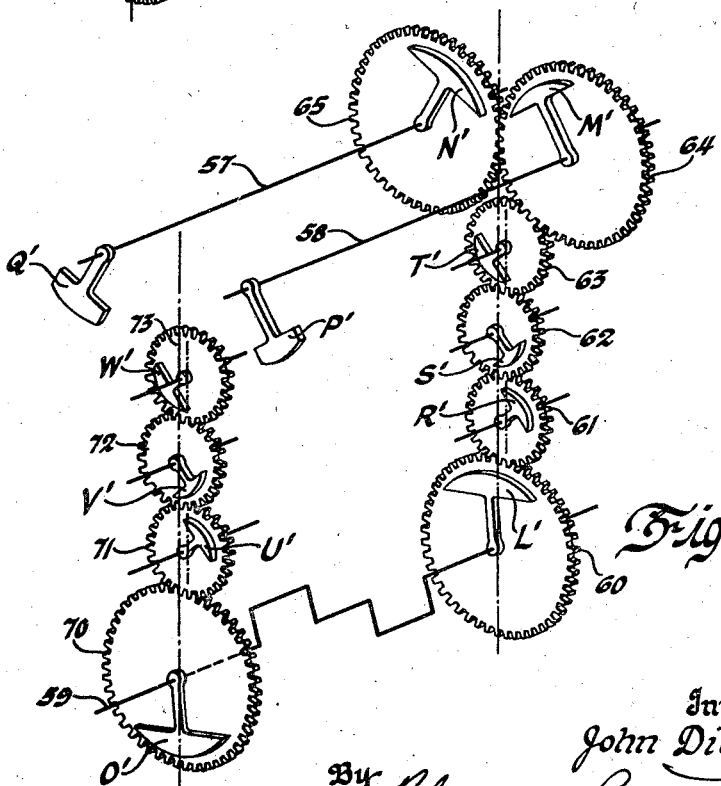
Figure 9 shows a possible gear train for balancing a four-cylinder two-cycle 45° V engine having a primary inertia rocking couple, a primary frame twisting couple, secondary inertia forces, and a secondary torque reaction couple.

The engine of the arrangement shown in Figure 9 has two camshafts 57 and 58 (one for each bank of cylinders), geared together to run in opposite directions at engine speed, and driven from the crankshaft 59; a gear 60 on the crankshaft, drives, through gears 61, 62 and 63 running at twice engine speed, the gear 64 on the camshaft 58, which is geared to the gear 65 on the camshaft 57. At the opposite end of the engine a gear 70 on the crankshaft, drives gears 71, 72 and 73, coaxial with the gears 61, 62 and 63. Considering the train of gears through which the camshafts are driven, the requisite masses for balancing the primary inertia rocking couple are divided between the gears 60, 64, and 65, and the requisite masses for balancing the primary frame twisting couples are provided in the gears 60 and 64; the weights L', M', N', are the resultants of all the masses in the gears 60, 64, and 65, respectively, which along with the corresponding but oppositely phased weights O', P', Q', at the opposite end of the engine will balance both the primary inertia rocking couple and the primary frame twisting couples. The weights R', S', T', in the gears 61, 62, and 63 along with the corresponding and similarly phased weights U', V', W', at the opposite end of the engine provide the requisite masses to balance the secondary inertia forces and a secondary torque reaction couple.

I claim:

1. In a multi-cylinder engine with a frame, a bank of cylinders in line; pistons in the cylinders, and a crankshaft with a crank arrangement such that there are resultant frame twisting couples in spaced planes parallel to the crankshaft axis and normal to the plane of the cylinder center lines, and a resultant inertia force couple in a plane parallel to the crank shaft axis and the plane of the cylinder center lines, an arrangement for balancing any harmonic of said frame twisting couples and said inertia force couple comprising means for producing alternating oppositely phased couples and forces in planes at opposite ends of the engine and normal to the crankshaft axis, said means including at least two revolving eccentric weights in each of said planes at opposite ends of the engine, said weights being driven from the engine crankshaft in opposite directions at the speed of the harmonic to be balanced and about axes on opposite sides of the plane of the cylinder center lines and in spaced planes parallel to the crankshaft axis and normal to the plane of the cylinder center lines and said two weights at each end of the engine including component masses of suitable mass and moment phased oppositely to each other as seen in positions of revolution in which their directions of eccentricity are normal to the plane of the cylinder center lines and so phased relatively to the crankshaft as to produce forces in said planes of rotation equal but opposite in phase and opposite to the forces of the resultant inertia force couple in said planes of rotation, and the distance apart of said spaced planes parallel to the crankshaft axis and normal to the plane of the cylinder center lines being such that said component masses produce couples in said planes of rotation equal but opposite to the frame twisting couples to be balanced in said planes.

2. In a multi-cylinder engine with a frame, a bank of cylinders in line, pistons in the cylinders and a crankshaft with a crank arrangement of the kind described, such that there is a resultant inertia force couple in a plane parallel to the crankshaft axis and the plane of the cylinder center lines, and resultant frame twisting couples which can be resolved into a couple in a plane normal to the crankshaft at one end of the engine and an oppositely phased couple in a similar plane at the opposite end of the engine, an arrangement for balancing any harmonic of such a resultant inertia force couple and resultant frame twisting couples including a pair of revolving eccentric weights of suitable mass and moment in each of said planes at opposite ends of the engine, said weights of each pair being driven from the engine crankshaft in opposite directions at the speed of the harmonic to be balanced and about axes on opposite sides of the plane of the cylinder center lines and in spaced planes parallel to the crankshaft axis and normal to the plane of the cylinder center lines, said weights of each pair being phased oppositely to each other as seen in positions of revolution in which their directions of eccentricity are normal to the plane of the cylinder center lines and so phased relatively to the crankshaft as to produce forces in said planes of rotation equal but opposite in phase and opposite to the forces of the resultant inertia force couple in said planes of rotation, and the distance apart of said spaced planes parallel to the crankshaft axis and normal to the plane of the cylinder center lines being such that said weights produce couples in said planes of rotation equal but opposite to the frame twisting couples to be balanced in said planes.

JOHN DICKSON.